United States Patent [19]

Berchem

[11] Patent Number: 4,936,546
[45] Date of Patent: Jun. 26, 1990

[54] FLOW-SETTING VALVE

[75] Inventor: Rütger Berchem, Essen, Fed. Rep. of Germany

[73] Assignee: Metalpraecis Berchem & Schaberg Gesellschaft Fur Metallformgebung Mit Beschrankter Haftung, Gelsenkirchen-Uckendorf, Fed. Rep. of Germany

[21] Appl. No.: 316,755

[22] Filed: Feb. 28, 1989

[30] Foreign Application Priority Data

Mar. 3, 1988 [DE] Fed. Rep. of Germany ....... 3806871

[51] Int. Cl.⁵ ................................................ F16K 5/06
[52] U.S. Cl. ..................................... 251/315; 251/368
[58] Field of Search ...................... 251/309, 315, 368

[56] References Cited

U.S. PATENT DOCUMENTS

| 2,832,563 | 4/1958 | Walsh | 251/309 |
| 2,929,606 | 3/1960 | Kaiser | 251/309 X |
| 3,195,585 | 7/1965 | Shafer | 251/309 |
| 3,617,025 | 11/1971 | Gerbic et al. | 251/315 X |
| 3,792,835 | 2/1974 | Shafer | 251/309 |
| 4,117,694 | 10/1978 | Belmore | 251/315 X |
| 4,337,919 | 7/1982 | Ripert | 251/315 X |
| 4,526,136 | 9/1985 | Caldwell, Sr et al. | 251/309 X |
| 4,771,803 | 9/1988 | Berchem et al. | 251/368 X |

Primary Examiner—John Rivell
Attorney, Agent, or Firm—Herbert Dubno

[57] ABSTRACT

A flow-setting valve has a housing, a flow-guiding duct, a ceramic valve ball and a flow-regulating spindle. The flow-regulating spindle has a plurality of form-fitting elements fitting in complementary receptacles of the valve ball. At least the valve ball is made of an engineering ceramic material. The form-fitting elements are located in the vicinity of the outer edge of a disk which is connected with the flow-regulating spindle. The diameter of the disk is approximately half the diameter of the valve ball.

1 Claim, 2 Drawing Sheets

FLOW-SETTING VALVE

CROSS REFERENCE TO RELATED APPLICATIONS

This application relates to the commonly owned co-pending applications: Ser. No. 07/128,819 filed Dec. 4, 1987; (now U.S. Pat. No. 4,755,133) Ser. No. 07/145,833, filed Jan. 20, 1988; (now U.S. Pat. No. 4,791,953) Ser No. 07/101,187 filed Sept. 25, 1987; (now U.S. Pat. No. 4,771,803) Ser. No. 07/222,189; (now U.S. Pat. No. 4,815,704) and Ser. No. 07/247,113 filed Sept. 20, 1988. (now U.S. Pat. No. 4,838,312).

Reference may be had to the following patents: U.S. Pat. No. 4,795,133, issued Jan. 3, 1989; U.S. Pat. No. 4,791,953, issued Dec. 20, 1988; and U.S. Pat. No. 4,771,803, issued Sept. 20, 1988.

1. Field of the Invention

My present invention relates to a ball valve and, more particularly, to a flow-setting valve with ceramic components.

2. Background of the Invention

A ball valve generally comprises a housing, a flow-guiding duct, a valve ball and a flow-regulating spindle which has a form-fitting element engageable in complementary receptacles in the valve ball. At least the valve ball is made of an engineering ceramic material.

Usually the flow-guiding duct is constructed with parts which are also of an engineering ceramic material. However the housing may be made of many different parts for assembly purposes and is provided with flanges or similar structural members.

The engineering ceramic material can be made from sintered corundum, metal carbide or metal nitride for example.

In the flow-setting valve on which the invention is based the form-fitting element is a part of or or formed on the flow-regulating spindle and received in a socket located centrally or concentrically relative to the rotation axis of the ball valve. The form-fitting element engages the valve ball with a small controlling lever arm. If a comparatively large force acts on the ball valve during a flow-adjusting motion, e.g. a frictional or adhering force, a comparatively large torque is required for this adjusting motion. Because of the small controlling lever arm, that leads to large forces between the form-fitting elements and the corresponding receptacles. The consequence can be premature breakage of the valve ball or damage to the valve ball.

OBJECT OF THE INVENTION

It is an object of my invention to provide a flow-setting valve in which during the controlling motion of the valve ball, even when comparatively large torques are applied, premature breakage of or damage to the valve ball does not occur.

SUMMARY OF THE INVENTION

This object and others which will become more readily apparent hereinafter is attained in accordance with my invention in a flow-setting valve comprising a housing, a flow-guiding duct, a ceramic valve ball and a flow-regulating spindle engaging the valve ball.

According to my invention the form-fitting element, which can be one of a plurality of such elements engaging the ball, is located in the vicinity of an outer edge of a disk which is attached to the flow-regulating spindle and the diameter of the disk corresponds to approximately half of the diameter of the valve ball.

According to one advantageous embodiment of the invention at least two form-fitting elements and/or receptacles (recesses or sockets) accommodating the elements are uniformly distributed about the circumference of the disk.

When only two form-fitting elements and/or receptacles are involved, of course, then they can be located diametrically opposite one another, i.e. generally in angularly equispaced relationship about the spindle axis.

When three form-fitting elements and/or receptacles are provided they are separated from each other by an angular spacing of about 120°.

The disk can be formed as a substantially flat component and can be mounted on a flattened portion of the valve ball facing the spindle. It is also possible to construct the disk as a spherical segment, for example a hemispherical segment, and to fit it complimentary to the valve ball. To avoid jamming, the receptacles can be provided with rounded edges.

It is very advantageous that when large torques are applied to the valve ball in the ball valve according to my invention during the adjusting motion, disturbing or damaging stresses and strains do not occur. That is because the form-fitting elements used in my invention engage the ball with a larger lever arm and then can be so equipped in regard to number and form that a low contact pressure prevails even with comparatively large torques.

The valve can be used for fine flow control of corrosive liquids and gases and with motorized or servo-mechanism drive of the spindle for fine adjustment of the flow rate.

BRIEF DESCRIPTION OF THE DRAWING

The above and other objects, features and advantages of my invention will become more readily apparent from the following description, reference being made to the accompanying highly diagrammatic drawing in which.

SPECIFIC DESCRIPTION

Figure 1:
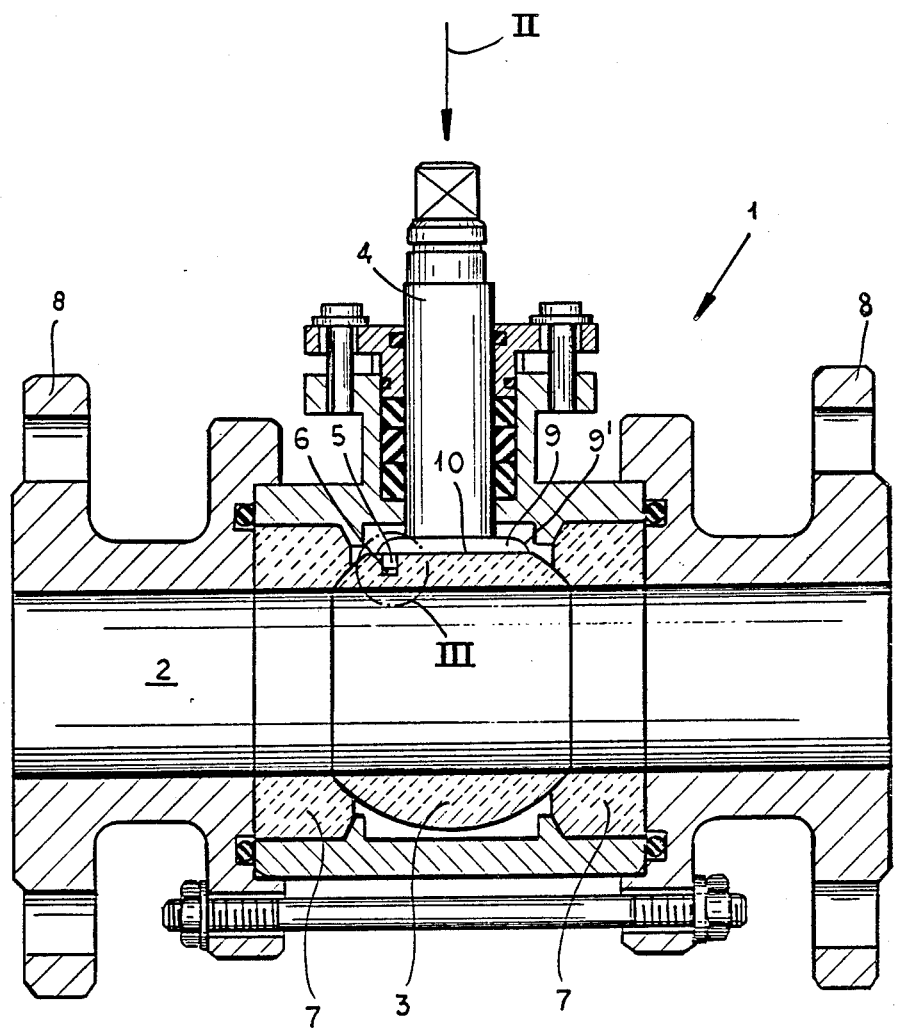
FIG. 1 is a vertical cross sectional view through a flow-setting valve according to my invention.

The flow-setting valve shown in the drawing basically comprises a multi-part housing 1, a flow-guiding duct 2, a valve ball 3 and the flow-regulating spindle 4. Form-fitting elements 5 of the flow-regulating spindle 4 fit in complementary recesses 6 in the valve ball 3 so that the flow-regulating spindle 4 engages in the valve ball 3. The valve ball 3 and also the seat rings 7 inserted in the housing 1 which form the flow-guiding duct 2 are made of an engineering ceramic materials described. Also the housing 1 is equipped with a flange 8 which is used for connection to a connecting pipe.

Figure 2:
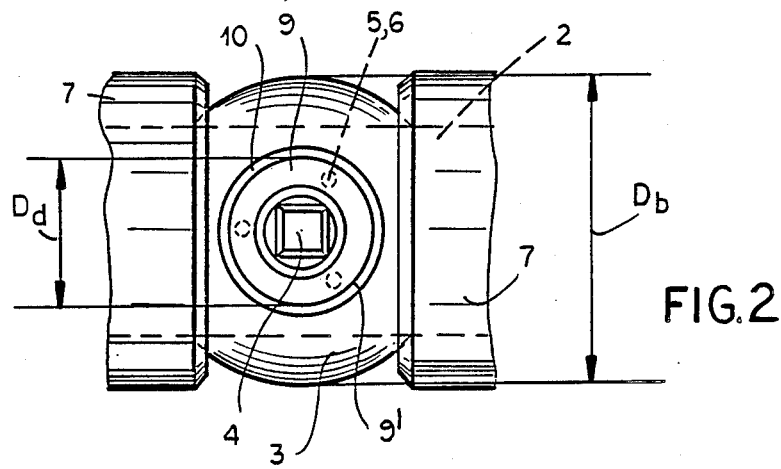
FIG. 2 is a top plan view of the apparatus in the direction of the arrow II of FIG. 1 with the housing removed.

From a comparison of FIGS. 1 and 2 it can be seen that the form-fitting elements 5 are located in the vicinity of the outer edge 9' of a disk 9 which is attached centrally and/or concentrically to the flow-regulating spindle 4. The diameter $D_d$ of the disk 9 corresponds approximately to half the diameter $D_b$ of the valve ball 3.

In the embodiment shown, three form-fitting elements 5 and consequently also the corresponding complementary sockets 6 are equally-spaced around the circumference of the disk 9.

The disk 9 in this example is a substantially flat component and is mounted on a flattened portion 10 on the valve ball 3.

Figure 3:
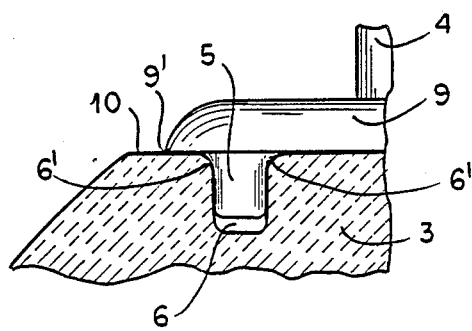
FIG. 3 is a detailed cross sectional view of the portion of the apparatus shown by the dot-dash circle III shown in FIG. 1.

From FIG. 3 one sees that the recesses 6 for the form-fitting elements 5 have rounded edges 6'. The flow-guiding duct 2 of the valve ball 3 is similarly formed at its entrance or outlet or is provided with beveling. Of course the flow-guiding duct 2 of the valve ball can also be formed like a nozzle or orifice.

Figure 4:
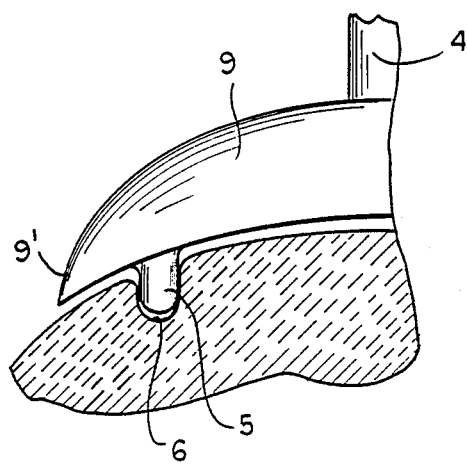
FIG. 4 is a detailed cross sectional view of a portion of another embodiment of a flow-setting valve according to my invention similar to FIG. 3.

FIG. 4 shows a different embodiment in which the disk 9 is shaped as spherical segment, in this case substantially hemispherical. Other portions of the ball valve are identical with those of the previous embodiment.

I claim:

1. A valve comprising:
   a valve housing provided with a flow passage;
   a valve ball of an engineering ceramic received in said housing along said passage and rotatable about a ball axis transverse to said flow passage to control flow through said passage;
   a valve spindle rotatable in said housing about said axis;
   a disk-shaped valve plate lying transverse to said spindle and affixed to said spindle adjacent said ball, said valve plate having a diameter perpendicular to said axis which is approximately half a diameter of said ball;
   a plurality of pins projecting from said plate in a direction toward said ball close to an outer edge of said plate and angularly equispaced about said axis; and
   a surface of said ball formed complementarily to said plate and juxtaposed therewith, said ball being formed with respective recesses complementary to said pins, opening at said surface and receiving said pins, said surface being a spherical segment and said plate having a respective spherically segmental surface abutting said surface of said ball, and said recesses having rounded edges at which said recesses open at said surface.

* * * * *